United States Patent
Hahn et al.

(10) Patent No.: US 10,188,027 B2
(45) Date of Patent: Jan. 29, 2019

(54) ROW UNIT WITH SHANK OPENER

(71) Applicant: Kinze Manufacturing, Inc., Williamsburg, IA (US)

(72) Inventors: Dustan Hahn, Williamsburg, IA (US); Matthew J. Wilhelmi, Parnell, IA (US)

(73) Assignee: Kinze Manufacturing, Inc., Williamsburg, IA (US)

( * ) Notice: Subject to any disclaimer, the term of this patent is extended or adjusted under 35 U.S.C. 154(b) by 50 days.

(21) Appl. No.: 15/160,632

(22) Filed: May 20, 2016

(65) Prior Publication Data

US 2016/0338260 A1 Nov. 24, 2016

Related U.S. Application Data

(60) Provisional application No. 62/164,326, filed on May 20, 2015.

(51) Int. Cl.
*A01C 7/20* (2006.01)
*A01C 5/06* (2006.01)

(52) U.S. Cl.
CPC ............ *A01C 7/203* (2013.01); *A01C 5/068* (2013.01)

(58) Field of Classification Search
CPC ........... A01C 5/06; A01C 5/062; A01C 7/203; A01C 7/18; A01B 49/06
USPC ........................... 111/134, 150, 149, 189, 52
See application file for complete search history.

(56) References Cited

U.S. PATENT DOCUMENTS

| | | | |
|---|---|---|---|
| 3,188,988 A * | 6/1965 | Peck ...................... | A01C 23/02 111/125 |
| 3,200,778 A * | 8/1965 | Whelchel ................. | A01C 7/08 111/134 |
| 3,673,970 A | 7/1972 | Hatcher | |
| 3,815,528 A * | 6/1974 | Hawkins ................... | A01C 5/06 111/134 |
| 4,208,974 A | 6/1980 | Dreyer et al. | |

(Continued)

FOREIGN PATENT DOCUMENTS

| | | | | |
|---|---|---|---|---|
| DE | 4309461 A1 * | 9/1994 | ............. | A01C 7/203 |
| FR | 2706235 A1 * | 12/1994 | ............. | A01C 7/203 |
| GB | 2004722 A * | 4/1979 | ............... | A01C 5/06 |
| RU | 2537908 C2 | 1/2015 | | |

OTHER PUBLICATIONS

Kinze Manufacturing, Inc., PCT/US2016/033534 filed May 20, 2016, "The International Search Report and The Written Opinion of the International Search Authority, or the Declaration" dated Aug. 19, 2016.

*Primary Examiner* — Thomas B Will
*Assistant Examiner* — Joan D Misa
(74) *Attorney, Agent, or Firm* — McKee, Voorhees & Sease, PLC

(57) ABSTRACT

A row unit for use with an agricultural implement is provided. The row unit includes a frame, a winged shank opener operatively connected to the frame, a depth-setting member operatively connected to the frame such that at least a portion of the winged shank extends below the depth-setting member to form a furrow and the depth-setting member at least partially controls the depth of said furrow, and a seed meter for planting seed in the depth formed by the winged shank opener. The depth setting member can be a ski, one or more gage wheels, or a combination of the same. A depth control mechanism can also be included to aid in controlling the depth of the furrow created.

19 Claims, 16 Drawing Sheets

(56) References Cited

U.S. PATENT DOCUMENTS

| | | | | |
|---|---|---|---|---|
| 4,217,835 A * | 8/1980 | Fox | | A01C 5/06 |
| | | | | 111/134 |
| 4,422,392 A * | 12/1983 | Dreyer | | A01C 5/06 |
| | | | | 111/134 |
| 4,432,292 A * | 2/1984 | Scott | | A01B 49/06 |
| | | | | 111/136 |
| 5,060,585 A * | 10/1991 | Alexander | | A01C 5/06 |
| | | | | 111/134 |
| 5,562,054 A * | 10/1996 | Ryan | | A01C 7/203 |
| | | | | 111/134 |
| 6,178,900 B1 | 1/2001 | Dietrich, Sr. et al. | | |
| 6,895,876 B2 * | 5/2005 | Bergere | | A01B 63/26 |
| | | | | 111/134 |
| 7,921,931 B2 * | 4/2011 | Henry | | A01B 61/046 |
| | | | | 111/151 |
| 8,505,473 B1 * | 8/2013 | Martin | | A01C 7/006 |
| | | | | 111/164 |
| 8,978,564 B2 * | 3/2015 | Hagny | | A01C 5/06 |
| | | | | 111/164 |
| 9,332,689 B2 * | 5/2016 | Baurer | | A01C 7/105 |
| 9,439,342 B2 * | 9/2016 | Pasquier | | A01B 79/00 |
| 9,585,299 B2 * | 3/2017 | Schumacher | | A01C 7/203 |
| 2004/0134399 A1 | 7/2004 | Stephens et al. | | |
| 2012/0227992 A1 | 9/2012 | Henry | | |
| 2014/0303854 A1 * | 10/2014 | Zielke | | A01C 21/00 |
| | | | | 701/50 |
| 2015/0289438 A1 * | 10/2015 | Sauder | | A01B 79/005 |
| | | | | 701/50 |
| 2016/0037709 A1 * | 2/2016 | Sauder | | A01C 7/203 |
| | | | | 700/275 |
| 2016/0113191 A1 * | 4/2016 | Rosengren | | A01C 7/06 |
| | | | | 701/50 |
| 2017/0034995 A1 * | 2/2017 | Wilhelmi | | A01C 5/062 |
| 2017/0086349 A1 * | 3/2017 | Tevs | | A01B 76/00 |
| 2017/0156257 A1 * | 6/2017 | Radtke | | A01C 7/046 |

* cited by examiner

ROW UNIT WITH SHANK OPENER

CROSS-REFERENCE TO RELATED APPLICATIONS

This application claims priority under 35 U.S.C. § 119 of a provisional application Ser. No. 62/164,326, filed May 20, 2015, which is hereby incorporated by reference in its entirety.

FIELD OF THE INVENTION

The invention relates generally to agricultural implements. More particularly, but not exclusively, the invention relates to a row unit for use with an agricultural implement that includes a shank opener, and, at least according to some aspects, a depth control measurement device to maintain a predetermined depth for a created furrow.

BACKGROUND OF THE INVENTION

An agricultural row crop planter is a machine built for precisely distributing seed into the ground. The row crop planter generally includes a horizontal tool bar fixed to a hitch assembly for towing behind a tractor. Row units are mounted to the tool bar. In different configurations, seed may be stored at individual hoppers on each row unit, or it may be maintained in a central hopper and delivered to the row units on an as needed basis. The row units include ground-working tools for opening and closing a seed furrow, and a seed metering system for distributing seed to the seed furrow.

In its most basic form, the seed meter includes a housing and a seed disc. The housing is constructed such that it creates a reservoir to hold a seed pool. The seed disc resides within the housing and rotates about a generally horizontal central axis. As the seed disc rotates, it passes through the seed pool where it picks up individual seeds. The seeds are subsequently dispensed into a seed chute where they drop into the seed furrow.

Agronomics has determined that seeds grow best at certain depths. Therefore, it has been desirable to attempt to form the furrows with a bottom at this depth in order to position the seed thereat to give the best chance at higher yields. This has been done with disk openers, gage wheels, depth adjustment systems, and combinations thereof. However, due to the ever-changing conditions, makeup, obstructions, and/or soil characteristics, the control of the depth is often inaccurate. This causes seeds to be planted at various depths, which can affect how the crops grow.

Therefore, there is a need in the art for a furrow or trench opener for creating and maintaining a furrow of a desired and continuous depth. There is also a need for a system to continuously monitor and control the depth of a created furrow.

SUMMARY OF THE INVENTION

It is therefore a primary object, feature, and/or advantage to overcome and/or improve on deficiencies in the art.

It is another object, feature, and/or advantage of the invention to provide a furrow opening shank that maintains a desired depth.

It is yet another object, feature, and/or advantage of the invention to provide a winged shank opener to create furrow of desired depth.

It is still another object, feature, and/or advantage of the invention to provide a row unit that plants seeds at a constant and desired depth.

It is a further object, feature, and/or advantage of the invention to provide a depth control measurement system with an electromagnetic wave transducer for measuring the depth of created furrows.

It is yet a further object, feature, and/or advantage of the invention to provide a ski attached to a row unit frame to aid in maintaining the desired depth of a furrow created with a shank.

It is still a further object, feature, and/or advantage of the invention to provide a row unit that is lower to the ground.

These and/or other objects, features, and advantages of the invention will be apparent to those skilled in the art. The invention is not to be limited to or by these objects, features and advantages. No single embodiment need provide each and every object, feature, or advantage.

The invention includes, according to at least some aspects, a system to determine planting depth comprising of a shank that opens a trench for seeding. The shank has wings on its side that pull the shank into and down below the ground surface in a variety of soil conditions. The shank is prevented from engaging too deeply in the ground with a ski mounted to the shank that slides in front of and surrounds the opened seed trench. The distance between the bottom of the shank and the bottom of the ski determines the depth of the seed trench. This distance is made adjustable by a pivoted mount and an actuator. The actuator is controlled by the planters electronic control unit (ECU). The depth can be set to a fixed depth defined by the farmer and adjusted as desired or can be managed by a pre-programmed prescription map for seed depth based on GPS location. Further adjustment and refinement to pre-programmed prescriptions might come from sensors that measure soil moisture and adjust seed planting depth based to optimize plant emergence and crop yield.

In addition, the ski may be replaced with gage wheels that are used to set the depth of the furrow created such as by controlling the depth of the shank in the ground as it moves through the field. The gage wheels can also be used to make sure that the shank extends a desired distance into the ground to aid in maintaining the depth of the furrow created.

Additional aspects of the invention can include a depth control measurement system for use with a row unit that has an electromagnetic wave transducer on a seed firmer that reflects off the row unit on to a gage ski with a receiver, a seed delivery system for use with the row unit, as well as other variations as will be understood.

Figure 1:
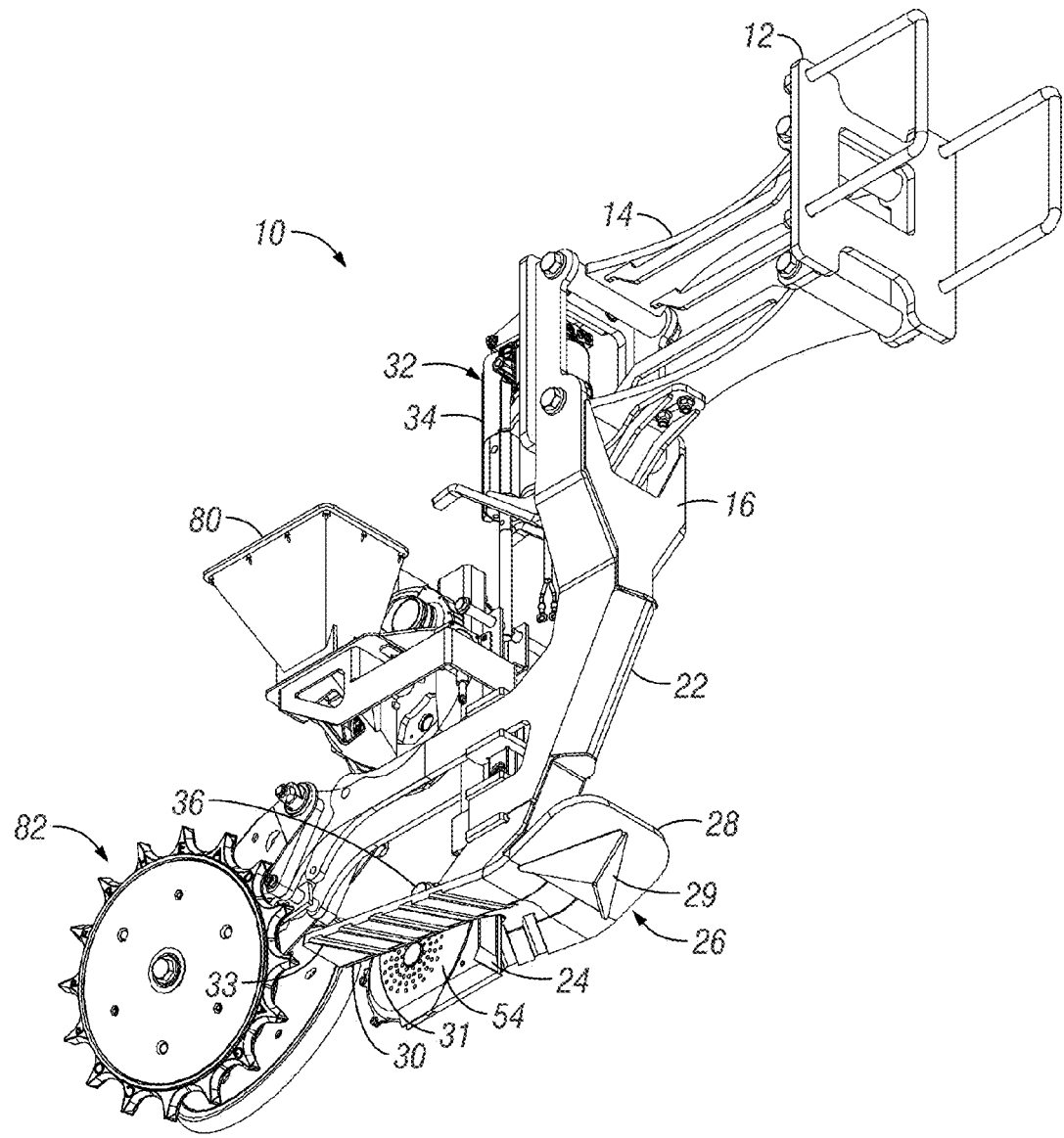
FIG. 1 is a perspective view of a row unit with a ski and winged shank opener according to aspects of the invention.
Figure 2:
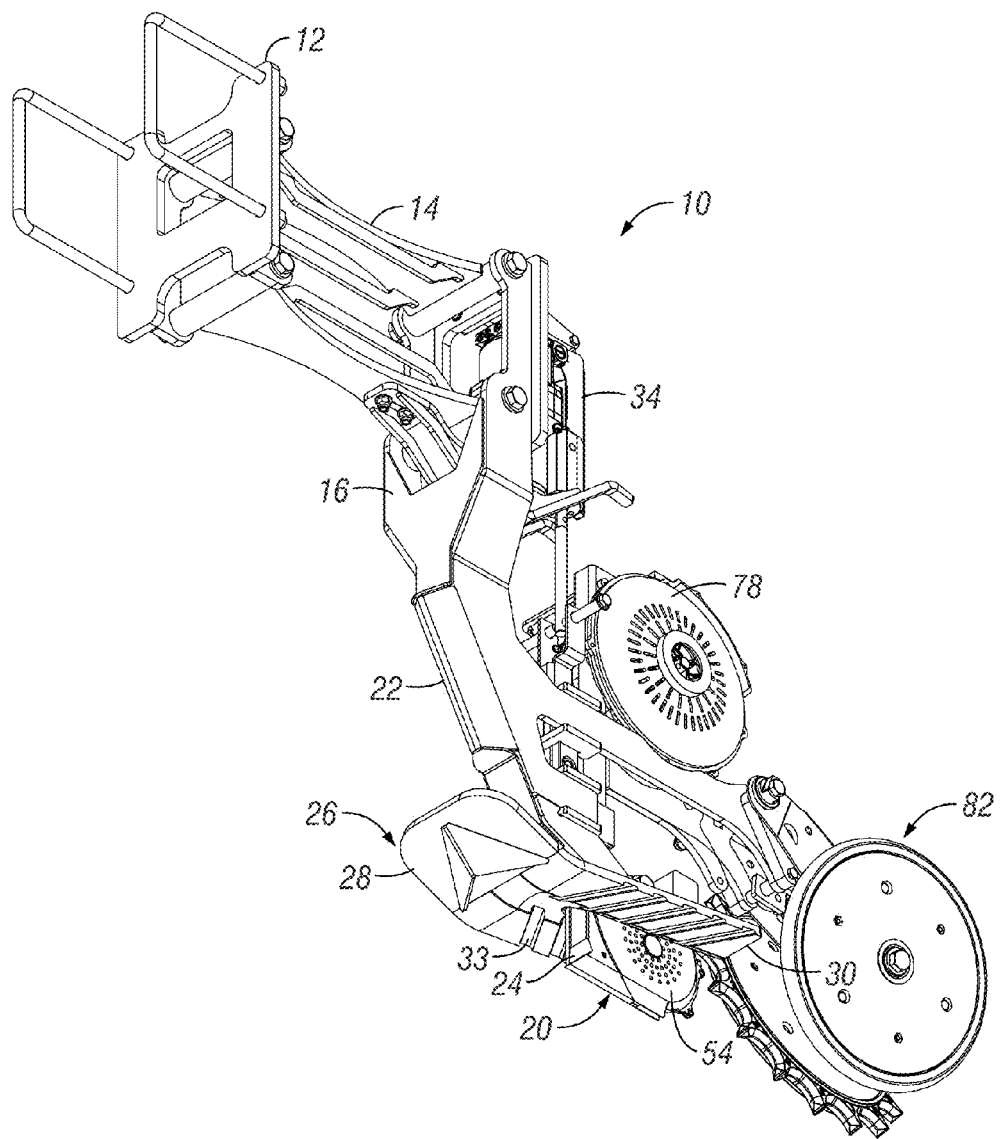
FIG. 2 is another perspective view of the row unit of FIG. 1.
Figure 3:
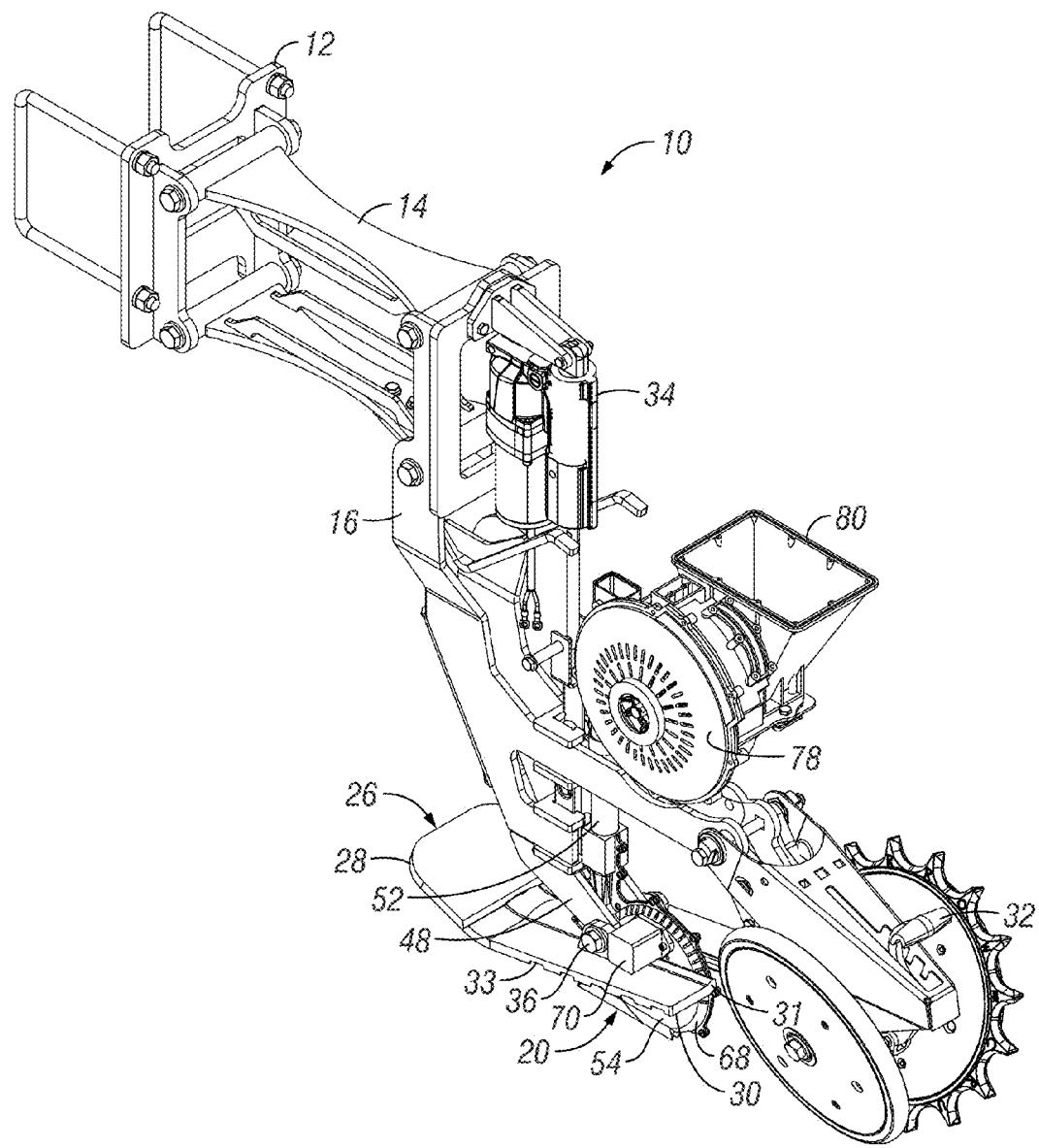
FIG. 3 is a rear perspective view of the row unit of FIG. 1.
Figure 4:
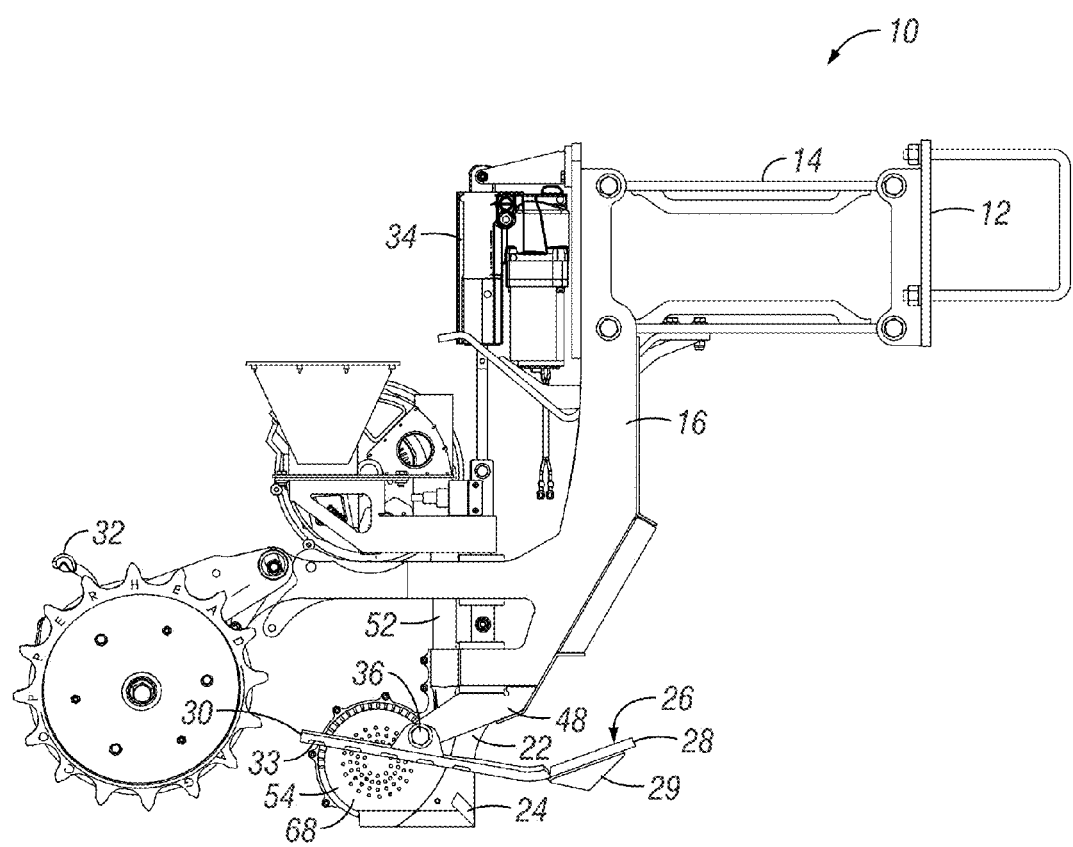
FIG. 4 is a side elevation view of the row unit of FIG. 1.
Figure 5:
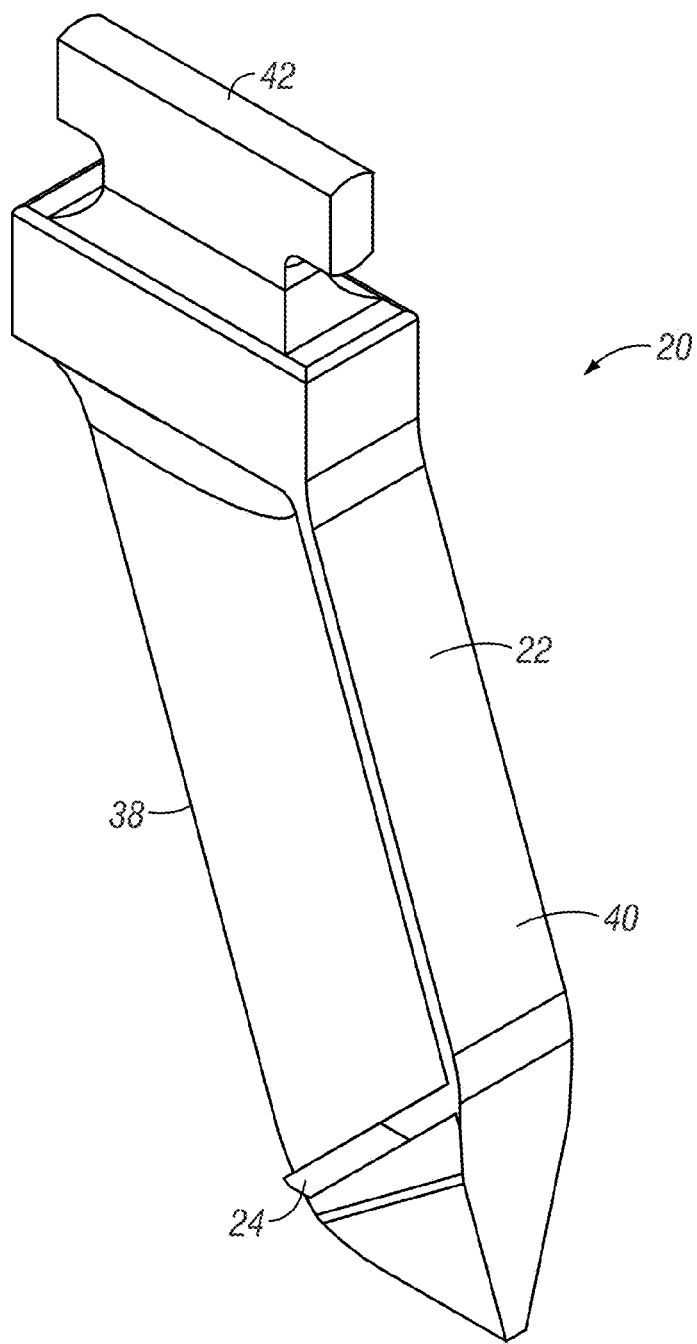
FIG. 5 is a perspective view of a winged shank opener according to aspects of the invention.
Figure 6:
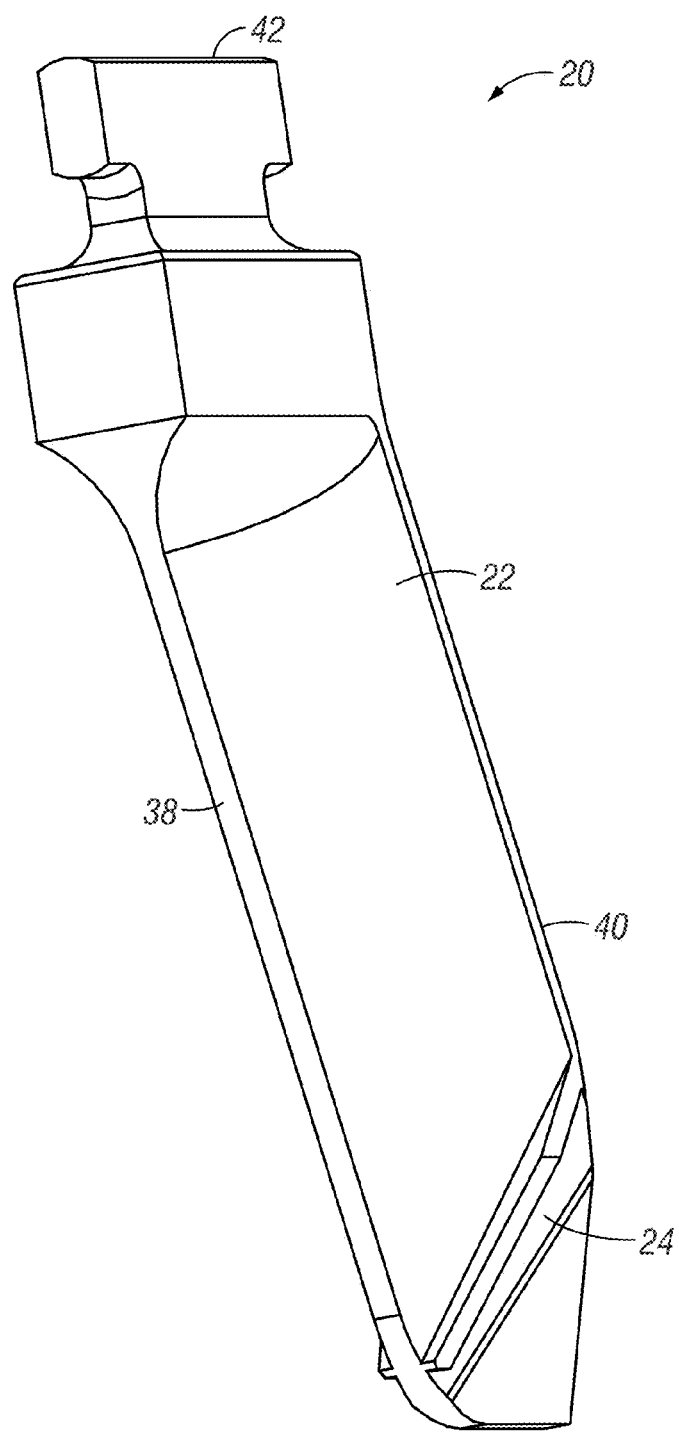
FIG. 6 is another perspective view of the winged shank opener of FIG. 4.

Various embodiments of the invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENTS

The invention relates to a row unit for use with an agricultural implement used to plant one or more varieties of seed in a field. As is known, a standard agricultural planting implement will include a plurality of row units based along a tool bar such that the number of row units coincide with a number of rows being planted via the components of the row unit as the implement moves through a field, such as by being pulled by a tractor or other towing vehicle. Therefore, while single row units may be shown and described in the present disclosure, it is to be appreciated that they can be used on a planter comprising a plurality of the same or a combination of multiple types of row units. The implement tongue and toolbar may be generally of any kind, including but not limited to telescoping or non-telescoping tongues, as well as front fold, rear fold, lifting, and set toolbars. Furthermore, it is contemplated that the invention could be used in a push/pull-style configuration where row units extend on both the front and behind a toolbar as it moves through a field.

A row unit 10, as is shown in FIGS. 1-4 includes various aspects of the invention. As is known, row units generally are used to form or create a furrow in a field wherein a seed, such as that has been singulated by a seed meter (such as the seed meter 78 shown in the Figures), is distributed into the furrow. The furrow is enclosed upon the seed, such as by closing wheels 82, thus, providing the seed in the field for growing. Based on a number of agronomical studies, it has been determined that certain types, varieties, and/or hybrids of seed flourish when planted at certain depths. Therefore, attempts have been made to provide row units with furrow-creating elements to attempt to form and maintain the furrow at the predetermined and/or desired depth, which is ideally an amount for providing the best growing conditions. Such configurations may include the use of opening disks, which are angled towards one another in a V configuration and pressed towards the ground with some sort of downforce or down pressure mechanism in an attempt to maintain a depth through the field. However, the amount of power required to maintain a uniform depth through a field of ever changing conditions has proven to be not as successful as desired. Therefore, the row units 10 as shown in FIGS. 1-4 include aspects for providing a more uniform depth of furrow or planting a seed in the furrow, regardless of soil conditions.

The row unit 10 as shown in the figures includes a faceplate 12 or other mechanism for attaching the row unit 10 to a toolbar of the planting implement. For example, U-bolts could be used in conjunction with or in the alternative to the faceplate. Extending from the faceplate 12 is a linkage 14, which allows the row unit 10 to move relative to the toolbar to which it is attached, and also allows for multiple rotational points. The linkage can be a 4-bar linkage or any other suitable linkage. It should be appreciated that the row unit 10 may not require use of a 4-bar linkage, and generally any mechanism or linkage can be utilized as is known in the art. Attached to and typically connected to the linkage 14 is a frame portion 16 of the row unit 10. The pivoting connection of the faceplate 12, linkage 14, and/or frame 16 allows for the row unit to be lifted out of the ground, while also allowing for movement in an up and down manner as the row unit 10 travels through the field. Therefore, if an obstruction, such as a rock, were to be in the way of the row unit, the movability of the linkage allows for the row unit 10 to pass the obstruction without much damage thereto.

Also shown in the figures and operably connected to the frame 16 is a shank 20, which may also be known as a shank opener. The shank opener 20 may be referred to as a winged shank opener 20. The winged shank opener 20 includes a body 22 extending at least partially downward towards the ground. The length of the shank 20 can be varied according to type of row unit, type of seed being planted, type seed meter utilized with said row units, type and/or composition of soil, or other factors associated with the agricultural implement. However, it is to be appreciated that at least a portion of the shank opener 22 can be manipulated to be positioned within the ground of the field to form a furrow therein for planting one or more types of seed. Furthermore, as will be understood, the winged shank opener 20 provides numerous advantages over other types of furrow-forming devices, such that the row unit 10 of the invention will create an improved and more uniform depth of furrow in the field such that seed dispensed via a seed meter of the row unit 10 can position seed in the furrow at a desired depth to give the seed the best chance of growing based on agronomic evidence.

As mentioned, the winged shank opener 20 will form the furrow in the field. The depth of the furrow created can be adjusted and/or otherwise determined by the amount or length of the shank 20 extended beyond a ski member 26 operably attached to the frame 16 of the row unit 10. As is shown in FIGS. 1-4, the ski 26 includes a forward section 28 and a rear section 30. The forward section 28 is at least partially slanted upward or otherwise raised to allow for the ski to be moved along the ground and the ever-changing conditions of the field. For example, having the upward turned front section 28 of the ski 26 will allow the ski to pass over and on top of any change in elevation, obstruction, and other conditions in which an upturn front could potentially dig into. However, it should be appreciated that the upturn portion of the front may not be required in all configurations or that the front and rear of the ski have upturn portions such that the ski is ambidextrous in directional use. Furthermore, as shown in the Figures, the front section may include an angled protrusion 29 or other shaped portion (displacement member) that aids in breaking up the ground as the row unit 10 moves through the field. The configuration of the ski 26 as shown in the figures is not to be limiting on the invention herein. The rear portion 30 of the ski 26 includes a gap or space 31 such that a portion of the winged shank opener 20 can pass though or beyond the ski 26. For example, the length of winged shank opener 20 extending beyond a bottom portion of the ski 26 can determine the depth of the furrow created by the winged shank opener 20. This is shown by the numeral 18 in the figures, wherein a length of the winged shank opener 20 is extending beyond the ski 26 to designate the depth of the furrow that will and can be created by the row unit 10 of the figures. Still further, the bottom of the ski 26 may include one or more grooves, channels, treads, or other cutouts 33. The channels 33 can aid in displacing soil or other materials in the field as the ski moves over and through. For example, the channels 33 can move displaced soil away from the ski 26 to allow for easier movement thereof. The channels 33 can take generally any shape, number, and/or other configuration, which will provide for improved movement of the ski 26. Still further, the bottom of the ski 26 may include a coating or separate material from the ski body to further aid in the movement of the ski 26 through and over the field. This could be a non-stick coating, protrusions to aid in breaking up the soil and any obstructions, wheels, or anything else that could aid in the movement of the row unit 10 through the field.

The ski 26 will provide numerous advantages, beyond just setting the depth of the furrow created by the winged shank opener 20. For example, the winged shank opener 20 is prevented from engaging too deeply in the ground because of the ski riding and sliding in front of and surrounding the open seed trench. Furthermore, the distance between the bottom of the shank and the bottom of the ski, as is shown by the numeral 18 in the figures, determines the depth of the seed trench or furrow. Furthermore, the ski 26 can be attached to the frame 16 at pivot points 36 to allow for the pivoting of the ski, such as to allow the ski to ride on unbalanced or uneven terrain through the field.

Furthermore, while the length of shank opener 20 extending beyond the bottom of the ski 26 is equivalent, at least approximately, to the depth of the seed trench or furrow, this can be adjusted either manually or automatically, as well as set for an entire usage or to automatically be updated as the implement is moving through a field. For example, a depth adjustment mechanism 32 is shown in the figures. The depth adjustment mechanism can adjust the amount or length of the shank opener 20 extended beyond the bottom of the ski 26. This can be done in a number of ways. For example, the depth adjustment mechanism 32 can be manually operated such that movement of a handle mechanically changes the length of shank opener 20 extending beyond the bottom of the ski 26. Furthermore, one or more actuators 34 can be used to adjust the length of shank opener 20 extending beyond the bottom of the ski 26. Furthermore, the distance can be made adjustable by a pivoted mount and an actuator 34, such as shown in the figures. The actuator can be controlled by the planting implement's electronic control unit (ECU), an intelligent control, computing system, or otherwise. The depth, which coincides with the length of the shank opener 20, can be set to a fixed depth defined by the operator and adjusted as desired, or can be an open loop system that is managed by a pre-program prescription map for seed depth based on GPS location. For example, the depth of seed planted could be determined based on soil characteristics such as moisture content, soil type, nutrients found in the soil, type of seed planted, obstructions, and other factors. The depth of furrow and/or trench created by the row unit 10 may be desired to be varied depending on the type of soil and/or soil characteristics. A pre-programmed prescription map, which can be programmed by having a sensor or other mechanism pass the field to take measurements of soil characteristics can be programmed such the depth adjustment mechanism, can be programmed to automatically change based upon these prior measurements. Still further, the row unit 10 may include sensors that update the system with updated soil characteristics to automatically update the creation of the furrow as the row unit 10 moves through the field.

Therefore, the pre-programmed map can be installed with a tractor and/or planter's intelligent control, such as an electrical control unit, wherein, based on the GPS location of each of the row units, the depth of the furrow can be adjusted automatically based upon the length of the shank opener extending into the ground. Furthermore, when planting multi-hybrid seeds with a single planting implement through a field, such as by one of the configurations shown and described in U.S. application Ser. No. 14/478,222, which is hereby incorporated by reference in its entirety, the depth can be adjusted based upon the hybrid of seed being planted at a particular location. This is known generally as an open loop configuration wherein the mechanism is automatically adjusted on the fly. Furthermore, sensors can be added to the row unit to continuously acquire information related to the soil characteristics and/or conditions so as to adjust the depth of furrow created by the row unit based upon the continuously updated reading of the sensors.

However, as mentioned, the contents of the disclosure can also be a closed loop system in which a pre-determined and defined depth is selected by an operator, and said depth is maintained simply by having the length of shank opener 20 extending beyond the ski 26 be approximately equal to said selected depth regardless of any change in soil characteristics, conditions, or type of seed being planted through a field.

FIGS. 5-9 show enlarged views of an exemplary embodiment of a winged shank opener 20 according to various aspects of the invention. As previously mentioned, the shank includes a shank body 22 which has a front portion 38 and a rear portion 40. The front portion 38 is narrower than the rear portion 40 in order to allow the shank to cut or otherwise be passed through the field as the implement is being pulled by a tractor or other tow vehicle. Therefore, it is to be appreciated that the shank opener 20 will knife or otherwise cut through the field to create a furrow for dispensing a seed therein for planting at a uniformed depth.

It should also be appreciated that the winged shank 20 could be formed as part of or otherwise attached to a portion of the row unit frame 16. This would allow an actuator 34 to control the down force and/or depth of the shank as it moves through the field for each of the row units 10 of a planter. The description of the shank 20 herein will cover generally any manner and/or method of having the shank be connected to or part of the row unit frame 16.

Figure 7:
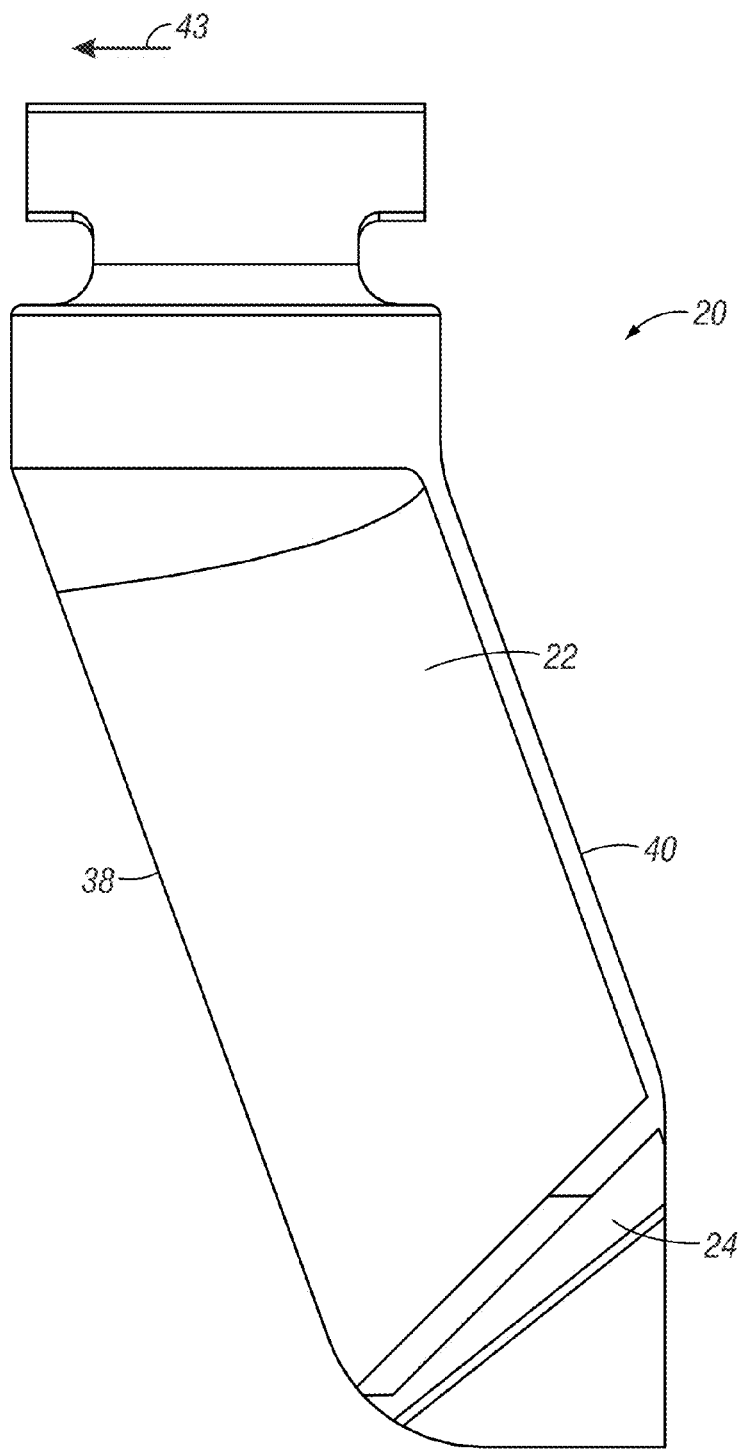
FIG. 7 is a side elevation view of the winged shank opener of FIG. 4.
Figure 8:
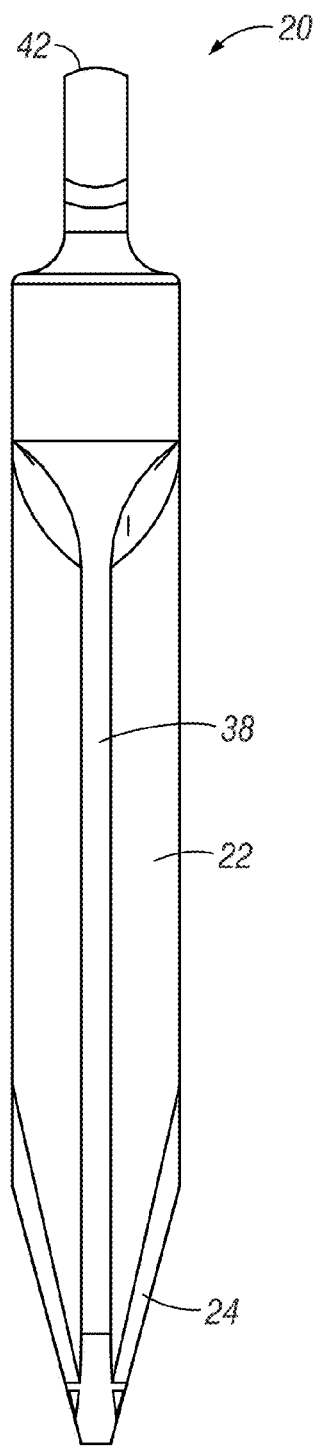
FIG. 8 is a front elevation view of the winged shank opener of FIG. 4.
Figure 9:
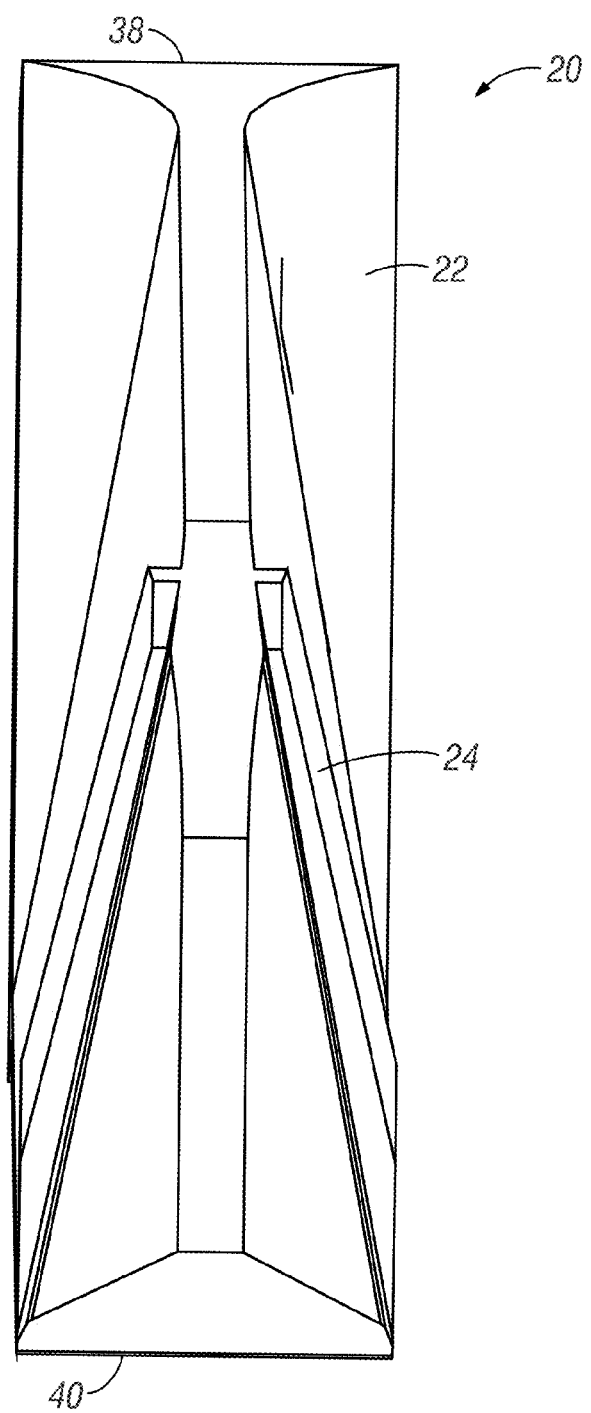
FIG. 9 is a bottom plan view of the winged shank opener of FIG. 4.
Figure 10:
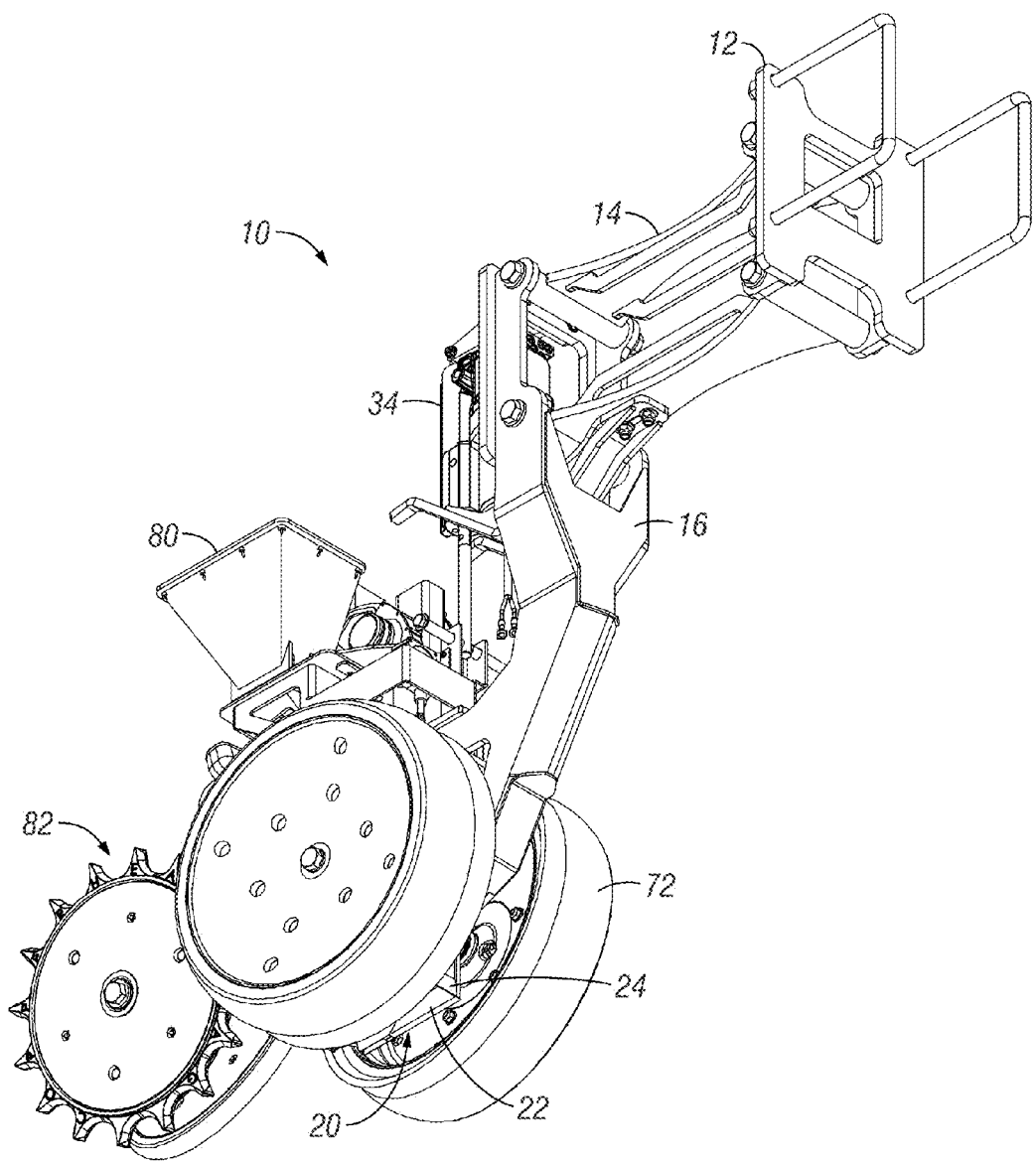
FIG. 10 is a perspective view of another embodiment of a row unit with gage wheels and a winged shank opener according to aspects of the invention.
Figure 11:
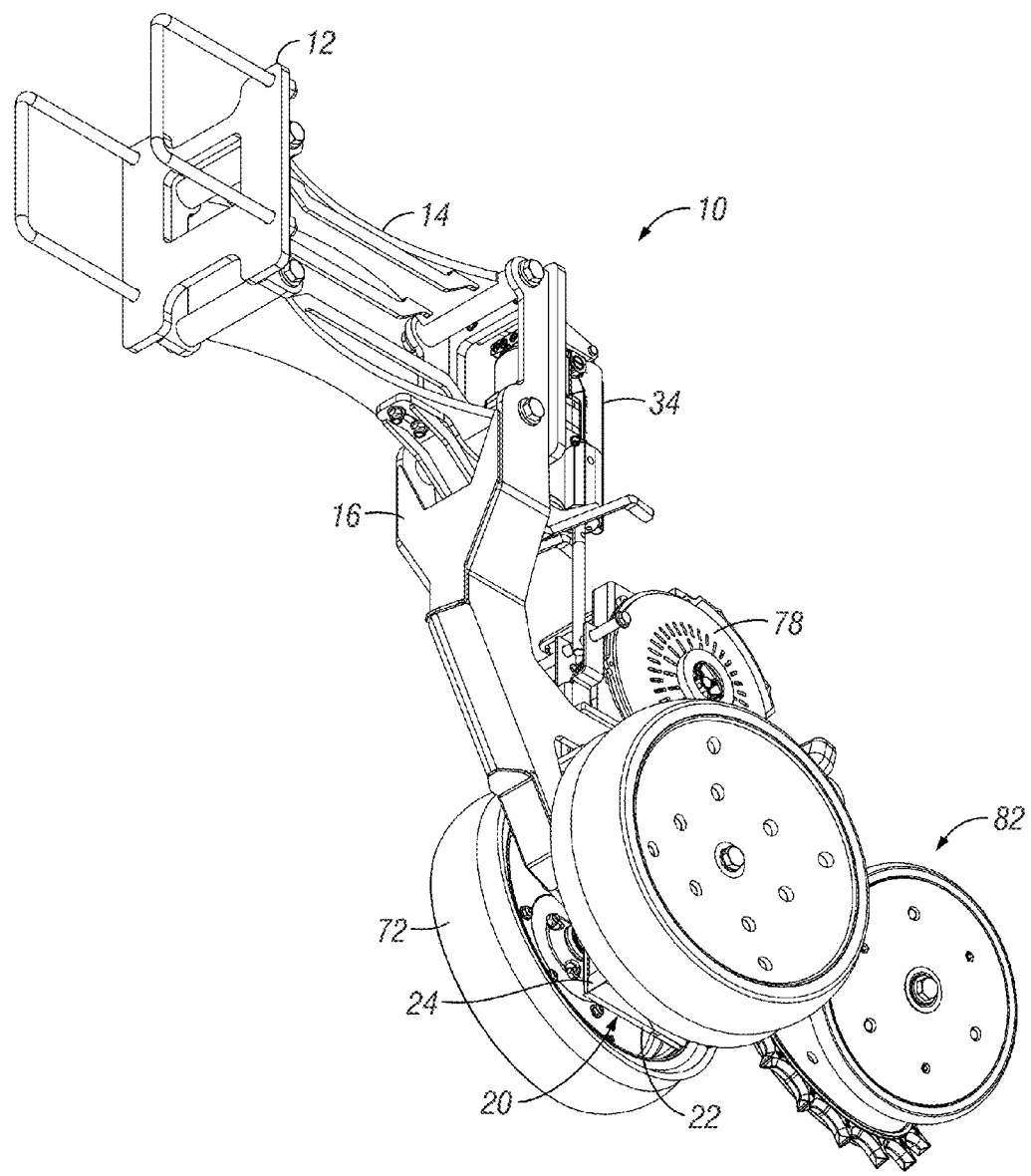
FIG. 11 is another perspective view of the row unit of FIG. 10.
Figure 12:
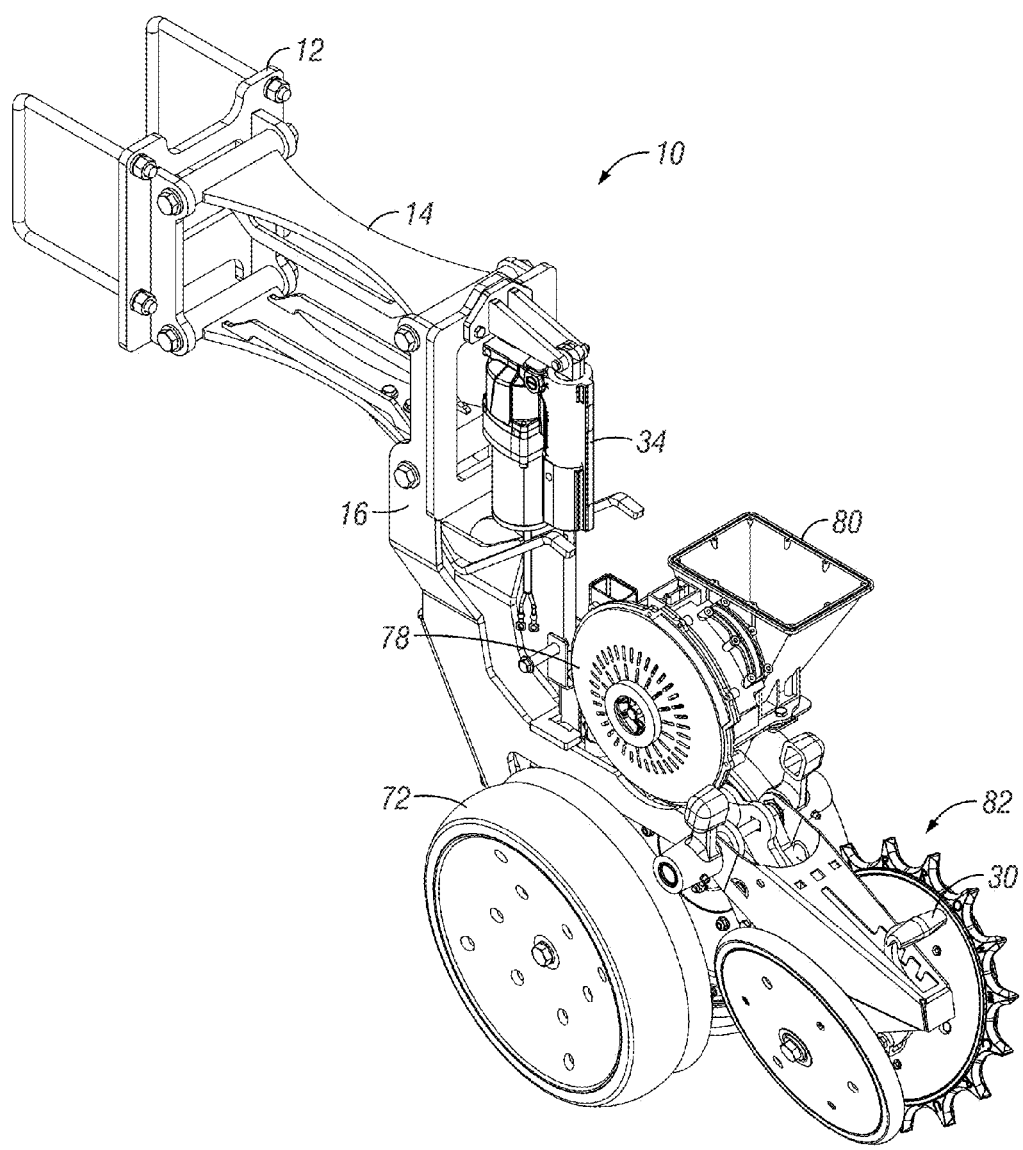
FIG. 12 is a rear perspective view of the row unit of FIG. 10.
Figure 13:
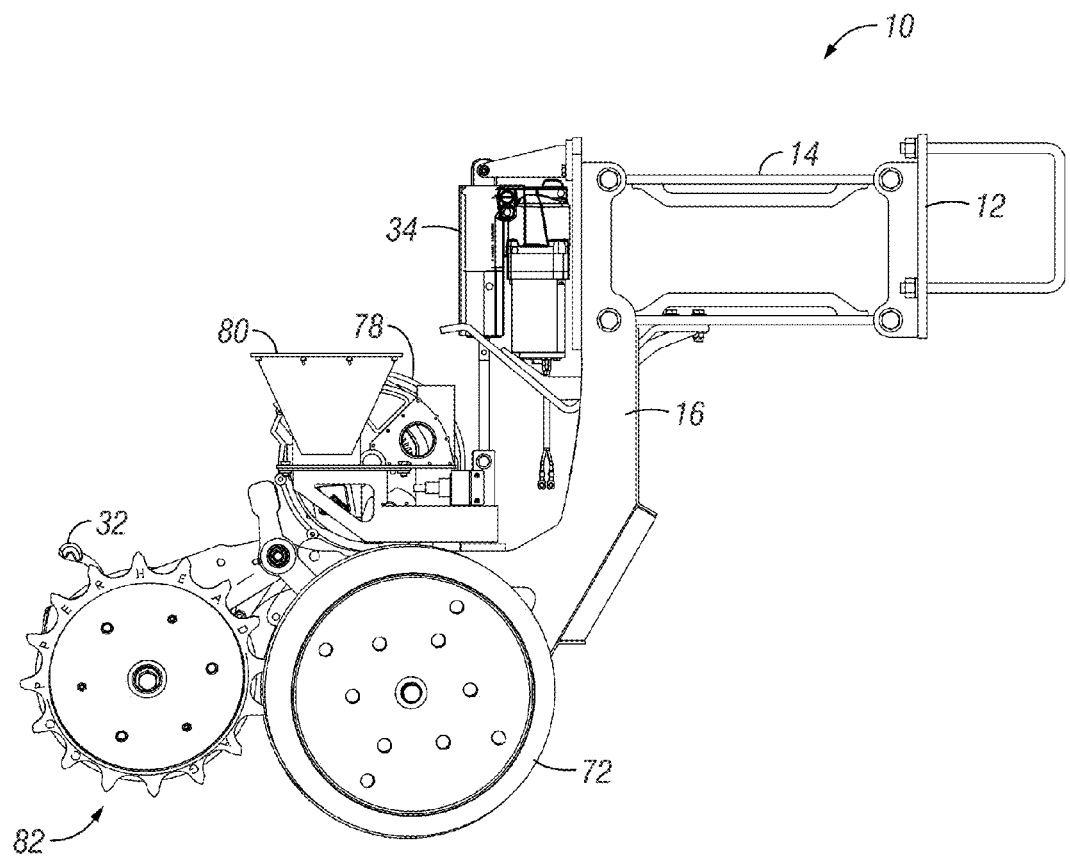
FIG. 13 is a side elevation view of the row unit of FIG. 10.

Furthermore, as has been mentioned, the shank opener 20 includes wings 24 positioned on the body 22. The wings 24, as is shown in figures, may be angled from the front portion 38 to the rear portion 40 of the body 22. For example, FIG. 7 is a side elevation view of the winged shank opener 20 showing the angled configuration of the wings 24 on the body 22. The shank opener 20 will move generally in the direction of the arrow 43 shown in FIG. 7. The upwardly angled configuration of the wings 24 on both sides of the shank body 22 will provide numerous advantages. For example, as the winged shank 20 moves in the direction of the arrow 43 through a field, the upwardly angled configuration of the wings 24 will be acted upon by the soil in the field such that the forces on the wings will push or drive the shank 20 in a generally downward direction. This downward pull or push on the wings 24 of the shank opener 20 will help in maintaining the depth of furrow created by continuously pushing the winged shank opener 20 in the said downward configuration. However, the ski 26, as previously disclosed, will prevent the shank from going deeper or creating a furrow of greater depth than desired. In other words, the wings 24 would pull the shank 20 into the ground due to the forces of the field acting on the wings 24. However, the ski would prevent the shank 20 from going too deep by controlling the distance between the bottom of the ski and the bottom of the shank 20. This would control the depth of the furrow created by the row unit 10 of the invention and also maintain a substantially uniform depth as the row unit moves through a field of ever-changing conditions. For example, as wings 24 will continuously pull the shank downward and the ski will prevent from going too deep, the distance between the bottom of the ski and the bottom of the shank will be maintained no matter what the conditions of the field such that the length of shank opener extending beyond the ski, which is substantially equivalent to the depth of the furrow created, will be maintained throughout the field.

The size and angle of the wings 24 on the shank body 22 can be varied and are not to be limited to the configurations shown in the figures. For example, the wings can be positioned steeper or narrower than is shown in the figures to account for various types of soil. For example, in some fields, clay or other materials may be part of the soil which may affect the ability of the shank 20 to move through the field. The wings may want to be pulled out of the ground due to the tougher makeup of the soil. However, in such a situation, the wings can be extended wider away from or outward of the shank body 22 to provide more downforce on the wings 24, which will drive the shank in the downward direction with greater force. This will aid in maintaining the desired depth of furrow created by the shank opener 20 in even tough conditions. However, in other conditions, such a pure soil, pure soil, or some sand/soil combination or other combination, the wing may also be adjusted in size and angular displacement accordingly. Therefore, it is considered that the wings generally be oriented at an angular displacement between 15 and 80 degrees above the horizontal axis. However, this is not to limit the invention.

The winged shank comprises steel or other metals capable of passing through an ever-changing terrain. For example, fields can comprise dirt, rocks, gravel, sand, clay, or combinations thereof. Therefore, the rigidity of the steel or other metal composition of the shank opener 20 will allow for the shank to move through the composition of the field with little to no damage thereto. And therefore, generally any composition of material capable of handling such forces on the shank opener 20 are to be considered usable for the shank opener 20. Furthermore, according to at least embodiments of the invention, the shank may be a one-piece molded material such that it is an integral unit that is attached to a portion of the row unit frame 16, such as a connection section 42 thereof. However, it is also contemplated that portions of the shank be welded or otherwise not integral with the rest of the body 22. For example, the wings 24 may be welded or otherwise connected to the body 22.

Furthermore, it is to be appreciated that the wings need not be fixed at a particular width and/or angular displacement relative to the rest of the shank body 22. For example, the wings may be pivotably connected to the shank body 22 such that an actuator or other member can adjust the angular configuration of the wings 24 relative to the body 22. The adjustability of the wings will allow the wings to best move through different soil types to maintain the desired depth of furrows created by the shank opener. This may also include a mechanism to widen the wings as well as to pivot them relative to the shank body. Still other variations to the shank opener are intended to be included as part of the invention.

FIGS. 10-13 disclose variations on the row unit 10. The row unit 10 of FIGS. 10-13 includes similar components of that previously shown and described with regard to FIGS. 1-4. However, some modifications exist. For example, the ski 26 as previously disclosed has been replaced with gage wheels 72. The gage wheels 72 provide yet another way to control the depth of the furrow being created, for example by controlling the amount of the shank 20 that is allowed to be moved into and through the field. Gage wheels operate by being set, such as by a depth control system 32, to set a distance between the bottom of the gage wheels and the depth of the furrow to be created. This distance can be equivalent or substantially equivalent to the length of shank 20 extending beyond a bottom of the gage wheels 72. The gage wheels 72 will ride on the field surface, which will aid in maintaining the amount of shank extending below, which will maintain a depth of furrow that is created by the row unit 10. A manual depth control system 32 can include a mechanical linkage that sets the gage wheel location relative to the frame 16 of the row unit 10, which will set the depth of the furrow. This will allow for manual changing of the depth. Still further, an actuator, such as a hydraulic actuator, electric linear actuator, pneumatic actuator, or some combination thereof, can be coupled between the frame 16 and the gage wheels 72 to set the depth of the furrow formed by the shank 20.

The manual adjustment of the gage wheels will provide a set depth that is to be maintained in a field or fields until the system is manually changed by an operator. An actuator can be coupled to an intelligent control, such as a computer processing unit, electrical control unit, and/or a user display of an operator. The intelligent control can provide for automatic adjustment of the gage wheels 72 to set the depth of furrow created, such as by allowing an algorithm to take into account planting, soil, and sensed characteristics in a field to provide for the depth to be created based upon data, such as agronomic data. The intelligent control can also be used to allow an operator to electrically adjust the depth of the furrow, such as by an input to the intelligent control (e.g., via the user display in the tractor, on a phone, on a table, or other computing device in communication with the intelligent control) to manually and electrically change the depth created by adjusting the gage wheels 72. The intelligent control can be positioned on the row unit, on the planter, and/or on the tractor, for controlling such a setup, and can include wired (ISOBUS, Ethernet, coax cables, etc.) and/or wireless (Wi-Fi, Bluetooth, cellular data, microwaves, light, etc.) communication.

Figure 14:
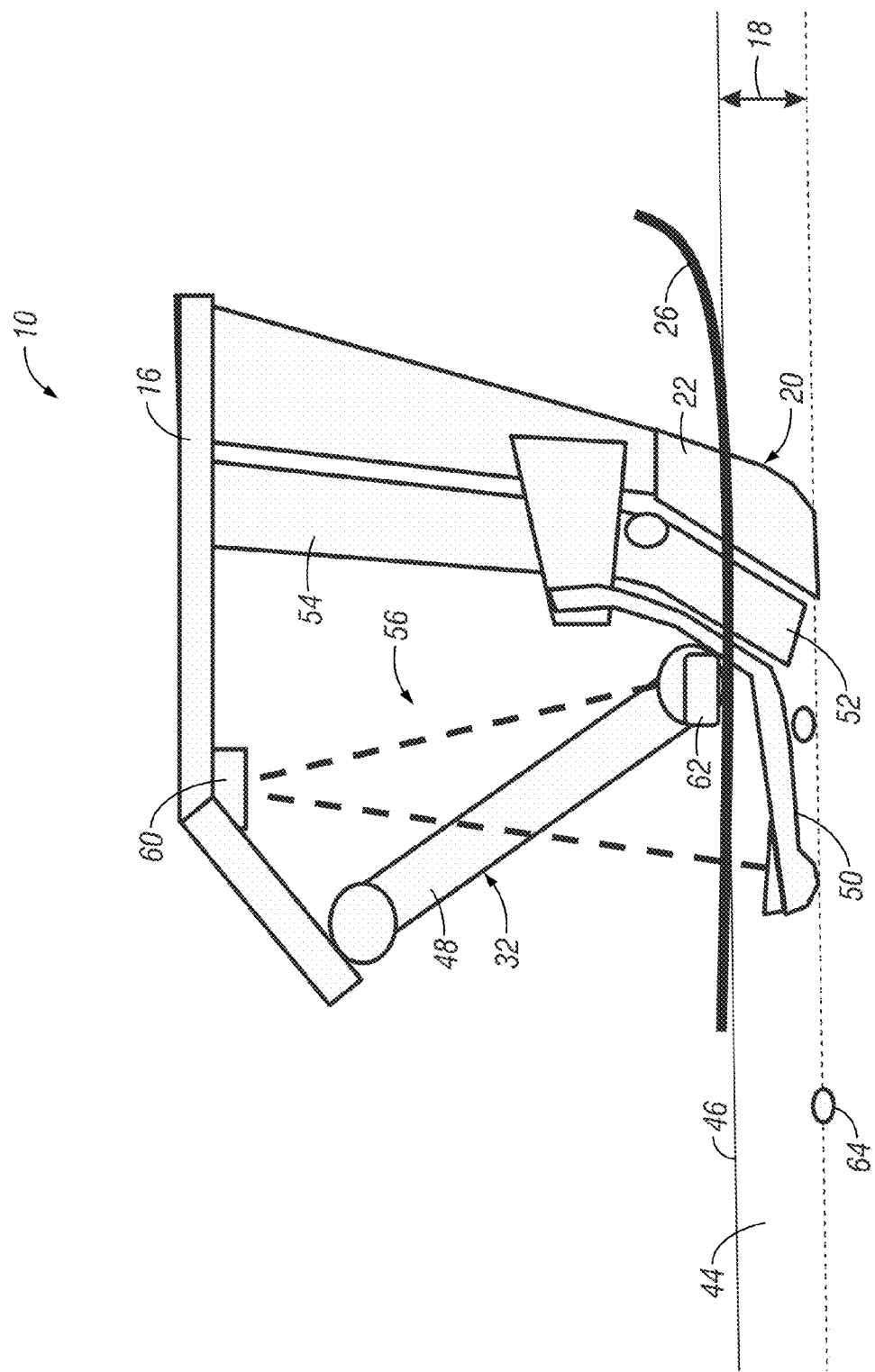
FIG. 14 is a diagram of a row unit according to aspects of the invention.
Figure 15:
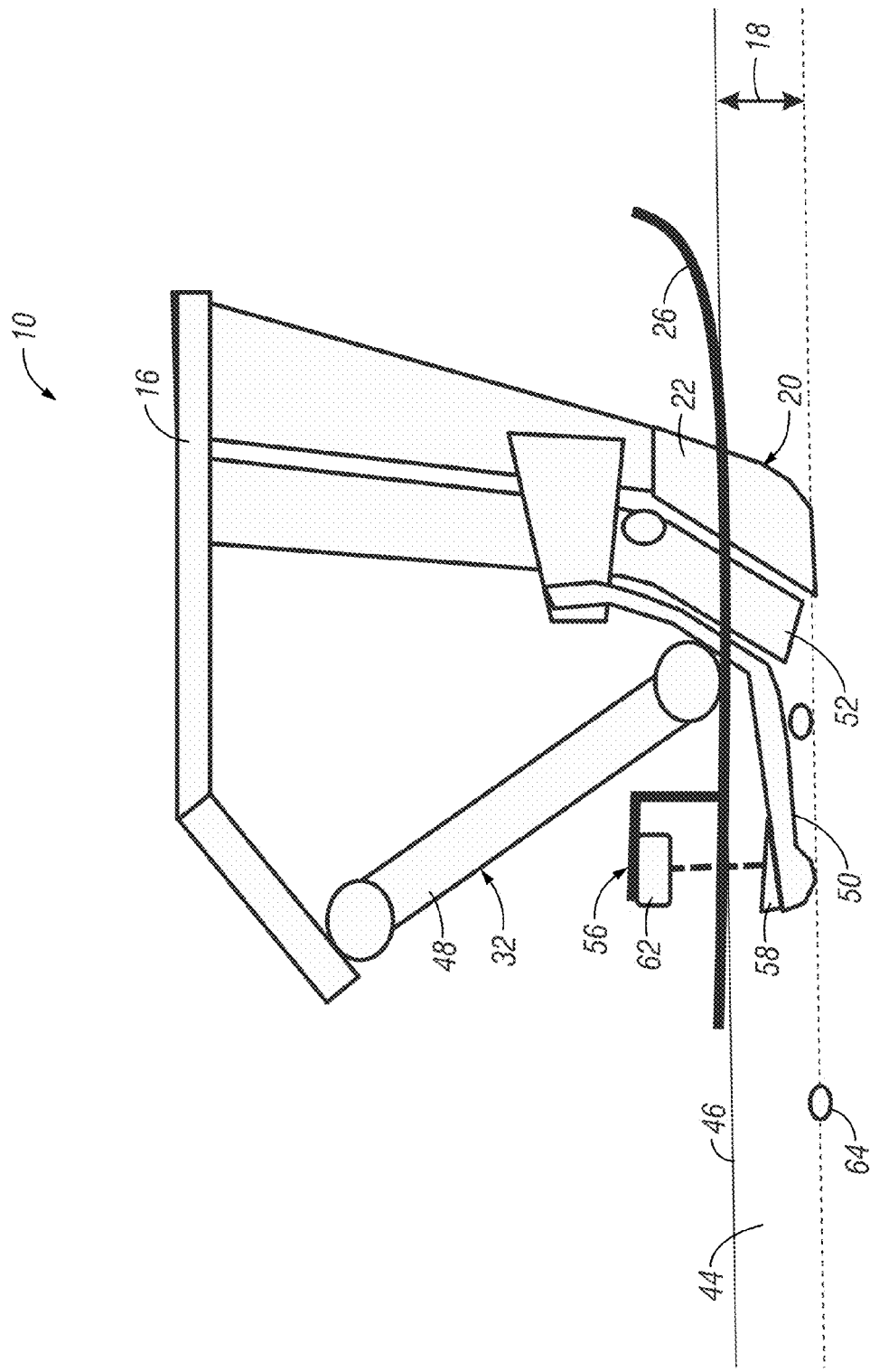
FIG. 15 is another diagram of a row unit according to aspects of the invention.
Figure 16:
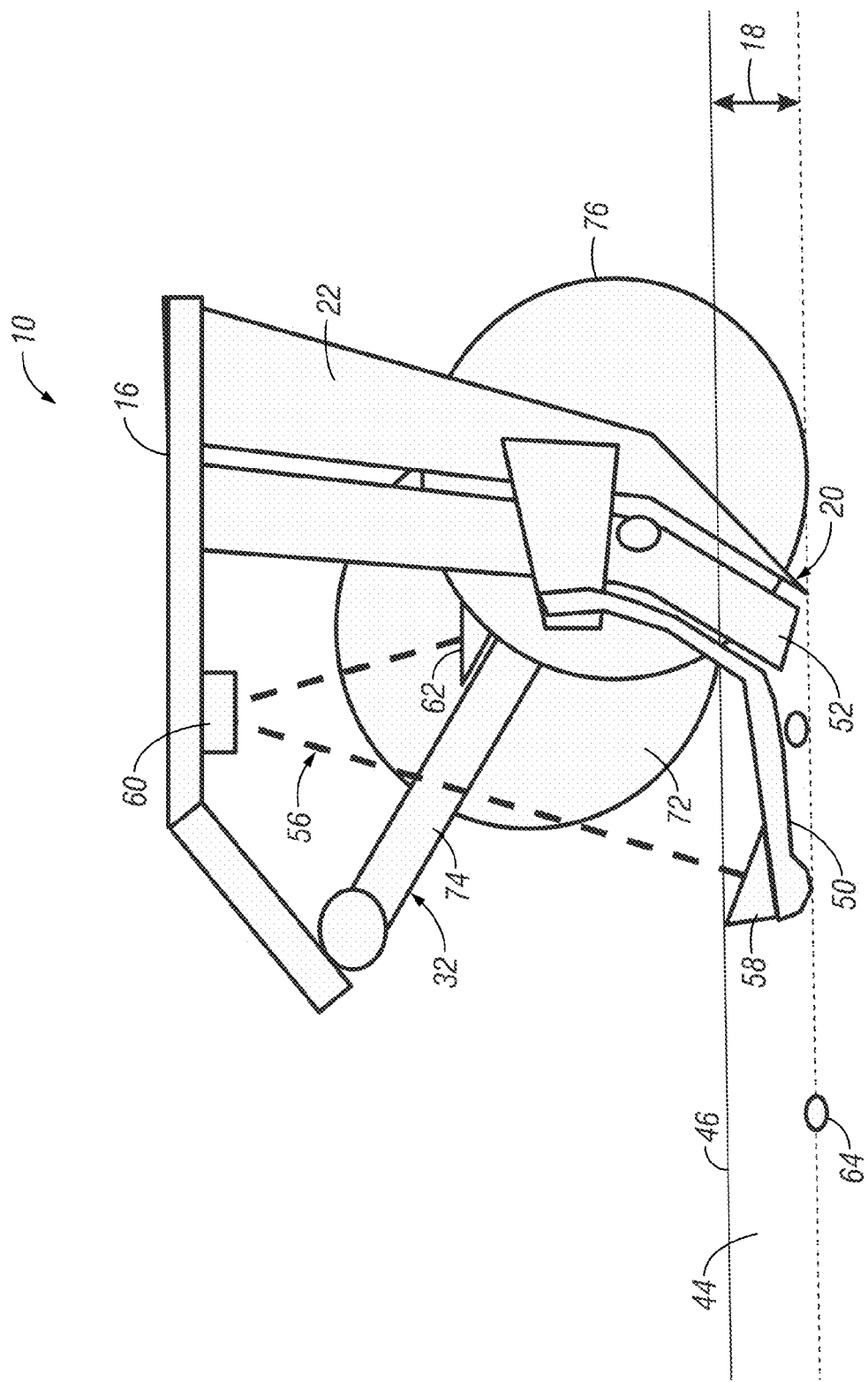
FIG. 16 is yet another diagram of a row unit according to aspects of the invention.

While the winged shank opener 20 of the invention has been shown and described to provide for maintaining a substantially uniform depth of furrow created by the shank opener of the row unit 10, FIGS. 14-16 provide an additional system to continuously measure the depth and to aid in controlling the depth of furrow created. For example, FIG. 14 provides a configuration of a row unit 10 according to aspects of the invention. The row unit 10 shown in FIG. 14 includes the row unit frame 16 as well as a row unit shank opener 20, which may be the winged shank opener as disclosed herein. As is shown in the figure, the shank opener 20 is utilized with a ski 26 to create a trench or furrow 44 having a depth 18 below the ground level 46.

Furthermore, as is shown, a seed delivery system 54 is positioned generally adjacent the shank opener 20. A seed delivery system 54 is utilized to transport seed singulated and dispensed by a seed meter 78 to deliver the seed in a controlled manner to the bottom of the furrow 44 created by the seed shank opener 20. The controlled movement of the seed from the seed meter to the furrow is ideal to provide for spacing between subsequent seed that will give the seed the best chance at growing and producing the highest yield of crop. Similar to the proper depth of planting, the spacing of subsequent seeds has been determined to be a factor in providing crops of highest yield. Therefore, the conjunction of a seed delivery system 54 with the seed shank opener 20 of the invention will provide for even greater growing characteristics for the planted seed.

One or more seed meters, such as those disclosed in U.S. Pat. No. 9,282,691, which is hereby incorporated by reference in its entirety, may be included for use at the row unit 10. The seed or seeds are singulated by the seed meter and are dispensed therefrom. The seed can then be controlled towards the bottom the furrow 44 by the seed delivery system 54. For example, as is shown in FIG. 14, a seed tube 52 is shown to be positioned generally adjacent and rear of the seed shank opener 20. Therefore, the seed 64 is dispensed into the seed tube 52 where the fall is controlled to the bottom of the furrow 44 that has been created by the shank opener 20. The subsequent seed will then be dispensed from the seed meter and also controlled to the bottom of the furrow and ideally, at a location that is spaced from the prior seed to allow for best growing conditions for both seeds. This continues on as the planter moves through the field. The seed tube 52 shown in FIG. 14 utilizes gravity as well as the shape of the tube to control the seed as it moves towards the bottom of the furrow 44. However, additional seed dispensing or delivery systems 54 are envisioned to be part of the invention.

For example, a seed delivery system such as that shown and described in U.S. application Ser. No. 14/619,758, which is hereby incorporated by reference in its entirety, can be utilized. As is shown and described in the application, the seed delivery system can include a tube or chute adjacent the meter. Seed is passed through the seed chute and towards a resilient member, which is shown to be a circular member. This is at least partially housed in a housing, wherein the seed is pinched or otherwise positioned between the resilient member and a portion of the housing. The resilient member is rotated, such as by an electric motor causing rotation of the resilient member. For example, the rotational velocity of the resilient member can be determined and decided such that it matches the ground speed of the planting implement as it moves through the field. Therefore, when the seed rotating with the resilient member is at the ejection point, it will experience substantially zero relative velocity relative to the ground as it is dispensed in the furrow 44. This will provide that the seed experiences little to no movement when positioned in the furrow. Therefore, as each subsequent seed is placed in the furrow, the lack of movement therein will provide for ideal spacing between subsequent seeds that are planted by the row unit 10. Furthermore, while the exact seed dispensing systems have been shown and described, it is to be appreciated that generally any type of seed delivery or dispensing system to place the seed in the bottom of the furrow created by the seed shank opener 20 can be utilized and is to be considered part of the invention.

As is also shown in FIG. 14, a depth control measurement system 56 is provided. The depth control measurement system 56 provides for a system to gauge or otherwise determine the depth of trench or furrow 44 created by the seed shank opener 20. While the seed shank opener, and preferably the winged shank opener 20 of the invention, should provide a furrow of desired and uniform depth through a field, a system 56 such as that shown and described can provide data to reflect and ensure that said depth is being maintained. The depth control measurement system 56 as shown in FIG. 14 includes a seed firmer 50 operably attached to the row unit 10, such as to the shank opener 20. The seed firmer includes a portion extending rearwardly of the shank opener and seed delivery system 54, such that it can reside or otherwise move along the bottom of the furrow 44 created by the shank opener 20. Positioned on a portion of the seed firmer 50 is an electromagnetic wave transmitter or transducer 58. The electromagnetic wave transmitter 58 can emit a signal to a reflector 60, which will transmit the signal to a receiver 62. This signal will provide the distance between the transmitter 58 and the receiver 62 to provide the depth of the furrow 44 being created by the seed shank opener 20. This can also provide the distance from the ground or bottom of the furrow to the toolbar.

As is known, commonly used in the industry is a load cell. However, load cells are more expensive and are not as accurate as electromagnetic wave transducers or transmitters. The load cell measures force. If the force is greater than zero it is assumed the row unit is fully engaged in the ground and the row unit is planting at depth. It assumes all mechanical pieces of the row unit are functioning properly, not worn, and set appropriately. Replacing the load cells with the depth measurement of the present disclosure will more accurately measure the depth of the furrow, which is independent on the mechanical pieces and will provide for a more direct and accurate depiction of how the system is operating to achieve the desired depth of furrow. Therefore, sending the signal from the transmitter 58 to a receiver 62 will provide an up-to-the-second measurement of the depth of the furrow 44 being created by the seed shank opener 20. If it is determined that the depth has gone outside an acceptable range, a depth adjustment mechanism 32, which is shown to be a ski arm 48 can be manipulated to adjust the depth of the furrow, such as by moving the ski relative to the shank opener 20 or vice versa. For example, the ski arm 48 can be an actuator, which can be a hydraulic actuator, pneumatic actuator, linear actuator, or some combination thereof. When the depth control measurement system 56 determines that a change in depth of furrow is required, the actuator can move one or both of the ski and/or shank opener 20 to adjust the amount of shank opener extending beyond the bottom of the ski 26. The continued acquiring of the depth of the furrow created can continuously adjust the row unit 10 to maintain a uniform depth throughout the ever-changing conditions of a field as the row unit 10 moves there through.

Furthermore, according to some aspects of the invention, instead of automatically adjusting the depth created, the depth adjustment mechanism or depth control measurement mechanism 56 can simply acquire the depth of furrow created as the row unit moves through the field to acquire for future purposes. For example, a prescription map can be created by determining areas of different soil compositions. If a harder soil type causes a shallower depth created by the row unit, this can be indicative of a need for more down force or down pressure of the row unit at said location. This can be programmed into a field map, such as for use in future planting seasons. Still other advantages of the depth control mechanism 56 of FIG. 14 should be obvious to those skilled in the art.

FIG. 15 shows yet shows another row unit 10 including aspects of the invention. Similar to FIG. 14, the row unit 10 includes a shank opener 20 used with a ski 26. The shank opener 20 may be a winged shank opener as previously shown and described, such that the wings aid in maintaining a more uniform depth of furrow created by the row unit 10 as it moves through the field. The row unit 10 also a depth adjustment mechanism 56 according to aspects of the invention. A seed firmer 50 is operably connected to the row unit 10 and includes an electromagnetic wave transmitter 58 positioned thereat. However, in the configuration shown in FIG. 10, an electromagnetic wave receiver 62 is connected to the wing 26 such that no reflector is needed. This can provide a direct signal from the transmitter 58 to the receiver 62 to provide the depth of furrow 44 created by the shank opener 20. Having the electromagnetic wave transmitter at the bottom of the trench or at an otherwise known distance from the receiver can provide an accurate calculation of a depth 18 created by the seed shank opener 20. Therefore, it is to be appreciated that the configurations shown in FIGS. 14 and 15 of the location of the electromagnetic wave transmitters 58, reflectors 60, and/or receivers 62 are not to be limited to the exact configuration shown and described. It is determined that the depth control measurement system can include components positioned generally anywhere on the row unit to allow for the system to calculate the depth of furrow being formed by the seed furrow opener of the row unit 10.

Furthermore, when a reflector 60 is utilized, the electromagnetic wave reflector can be generally any hard flat surface that redirects the electromagnetic waves from the transmitter towards the receiver such that a calculation of furrow depth can be determined.

FIG. 16 is a configuration of yet another row unit 10 including a depth control measurement system 56. In FIG. 16, the row unit 10 includes a frame 16 with a shank 20. However, the shank is not a furrow opening shank in the configuration shown in FIG. 16. Instead, the opening seed disks or furrow disks 76 are included with the row unit 10 to create the furrow of desired depth 18. The disks 76 work with one or more gage wheels 72, which ride on the ground 46 such that the distance of the disk below the gage wheel is indicative of the trench depth 18. The gage wheel 72 includes an arm 74 that can be adjusted to adjust the depth of furrow created by the seed disks opener 76. Furthermore, a seed delivery system that is shown to be a seed tube 52 is still utilized and positioned generally behind the opening disks 76 as is shown in the figure.

To determine the depth of furrow 44 created by the opening disks 76, a depth control measurement system 56 is provided. The system 56 includes a seed firmer 50 operably connected to the shank 20. Positioned on a portion of the seed firmer 50 residing at the bottom of the trench 44 is an electromagnetic wave transmitter 58. The electromagnetic wave transmitter emits the electromagnetic wave therefrom. The electromagnetic wave, which is shown as the dash line in the figures, is directed towards a reflector 60, which reflects the electromagnetic waves towards a receiver 62. Having known locations of the receiver relative to a portion of the row unit will allow the depth control measurement system 56 to determine the depth of furrow created by the opening disks 76. Therefore, an operator can manually see the depth being created, and can adjust, such as by adjusting the gage wheel arm 74 or other adjustment mechanism 32.

Furthermore, the depth control measurement system 56 can be connected to an intelligent control, such as an electric control processing unit to automatically adjust the gage wheel 72 and opening disks 76 so as to provide a furrow depth of desired distance. This can be continuously updated as the row unit 10 moves through the field.

Therefore, the invention has been shown and described to provide numerous advantages for creating and maintaining a furrow of desired depth as the row units of a planting implement move through a field. In some instances, a winged shank opener can be provided to create the furrow such as by extending the distance beyond the bottom of a ski member. The length of shank opener below the ski will be substantially equal to the depth of furrow created. The wings on the shank opener will continuously push the shank opener in a downward direction, while the ski will prevent the shank from moving too deep into the ground. This will provide a substantially uniform depth to any type of soil or ground condition as the planting implement moves through a field. Furthermore, a depth adjustment mechanism can also be utilized with a row unit including either a winged shank opener or any other opener. A depth control measurement system can provide a continuously monitored depth measurement of the furrow as the row units of the plant implement move through a field. The information acquired by the depth control mechanism can be shown to an operator, such as on the user display in the cab of a tractor, phone, tablet, or other computing device, or can be simply maintained in a control processing unit or other intelligent control. Displaying the information will allow an operator to make a manual adjustment, such as by adjusting one or more actuators, gage wheels, or other components of the row unit to attempt to maintain the uniform depth of furrow created. For example, this may be adjusting a down pressure actuator or other actuator on the row unit. Still further, the system may be an open loop system in which upper and lower boundaries are inputted for the depth of furrow, and wherein when the depth control measurement system determines that the depth is outside of the upper or lower boundaries, the system automatically adjusts a component of the row unit to put the trench depth at or within the accepted levels.

Still other advantages obvious to those skilled in the art will be readily apparent and are considered to be a part of the invention. The invention is not to be limited to the exact configurations shown, and the figures and descriptions thereof are to be considered exemplary embodiments of the invention.

What is claimed is:

1. A row unit for use with an agricultural implement, comprising:
   a frame;
   a winged shank opener operatively connected to the frame and comprising:
      a rear portion;
      a front portion that is narrower than the rear portion; and
      first and second wings on opposite sides of the winged shank to aid in pulling the winged shank into a field, said wings being angled from the front portion to the rear portion; and
   a ski member operatively connected to the frame such that at least a portion of the winged shank extends below the ski member to form a furrow and the ski member at least partially controls the depth of said furrow, wherein said ski member comprises:

a front section having an angled protrusion for initially breaking up soil in the field as the row unit travels in a forward direction; and a rear section having a gap such that part of the winged shank passes through the gap to displace broken up soil away from the ski member and the winged shank.

2. The row unit of claim 1, further comprising a depth adjustment device to adjust the length of the winged shank extending below said ski member.

3. The row unit of claim 2, wherein the depth adjustment device comprises an actuator extending between the frame and the winged shank to adjust the length of the winged shank relative to the ski member.

4. The row unit of claim 1, wherein the winged shank is a one-piece molded material attached to the frame via a connection portion.

5. The row unit of claim 1, wherein the ski member at least partially controls the depth of said furrow by maintaining a fixed distance between the bottom of the ski member and the bottom of the winged shank while the agricultural implement moves through the field, thereby at least partially preventing the ski member from going to deep into the ground.

6. The row unit of claim 1, further comprising a seed meter operatively connected to the frame and configured to singulate and dispense seed into the furrow created by the winged shank.

7. The row unit of claim 6, further comprising a seed delivery system operatively connected to the seed meter to aid in delivering the seed dispensed from the meter to the furrow created by the winged shank.

8. The row unit of claim 7, wherein the seed delivery system comprises a seed tube.

9. The row unit of claim 7, wherein the seed delivery system comprises:

a seed tube operatively connected to the seed meter; and a resilient member at least partially in a housing for receiving seed from the seed tube and transporting seed at least partially between the housing and the resilient member to discharge the seed towards the furrow, wherein the resilient member comprises a substantially circular member positioned in the housing and further wherein part of the housing is positioned within the gap.

10. The row unit of claim 9, further comprising:

an electric motor operatively connected to the resilient member to control the rotational velocity thereof;

wherein the rotational velocity of the resilient member is determinative on the ground speed of the row unit.

11. The row unit of claim 1, further comprising a depth control measurement system comprising:

a seed firmer positioned at least partially behind the winged shank;

an electromagnetic wave transmitter operatively positioned on the seed firmer; and an electromagnetic wave reflector operatively positioned on the frame such that the transmitter and reflector communicate to determine a distance therebetween to determine the depth of the furrow being created by the winged shank.

12. The row unit of claim 11, further comprising an electromagnetic wave receiver operatively positioned on the ski member for determining the depth.

13. The row unit of claim 12, further comprising an actuator operatively connected to the ski to adjust the position of the ski member based upon the measurements of the depth control measurement system.

14. The row unit of claim 1, wherein the wings are oriented at an angular displacement between 15 and 80 degrees above a horizontal axis.

15. The row unit of claim 1, wherein the wings are steel welded to the front portion and the rear portion.

16. A row unit for use with an agricultural implement, comprising:

a frame;

a winged shank opener operatively connected to the frame and comprising:

a rear portion;

a front portion that is narrower than the rear portion; and first and second wings on opposite sides of the shank to aid in pulling the winged shank into a field, said wings being angled from the front portion to the rear portion;

a depth-setting member operatively connected to the frame such that at least a portion of the winged shank extends below the depth-setting member to form a furrow and the depth-setting member at least partially controls the depth of said furrow and comprising:

a gap between at least two components of the depth-setting member such that part of the winged shank passes through the gap;

a seed meter for planting seed in the depth formed by the winged shank; and a substantially circular member at least partially in a housing for receiving seed from the seed meter and transporting the seed at least partially between the housing and the substantially circular member to discharge the seed towards the furrow, wherein the housing is positioned within the gap.

17. The row unit of claim 16, wherein the depth-setting member comprises gage wheels operatively connected to the frame of the row unit.

18. A depth control mechanism for use with a row unit including a frame; a winged shank opener operatively connected to the frame and comprising a rear portion, a front portion that is narrower than the rear portion, and first and second wings on opposite sides of the shank to aid in pulling the shank into a field, said wings being angled from the front portion to the rear portion; and a depth-setting member operatively connected to the frame such that at least a portion of the winged shank extends below the depth-setting member to form a furrow and the depth-setting member at least partially controls the depth of said furrow and comprising a front section having an angled protrusion for initially breaking up soil in the field as the row unit travels in a forward direction; and a rear section having a gap such that part of the winged shank passes through a ski member and channels to displace broken up soil away from the ski member and the winged shank; said depth-control mechanism comprising:

a seed firmer positioned at least partially behind the winged shank;

an electromagnetic wave transmitter operatively positioned on the seed firmer; and an electromagnetic wave reflector operatively positioned on the frame such that the transmitter and reflector communicate to determine a distance therebetween to determine the depth of the furrow being created by the winged shank.

19. The depth control mechanism of claim 18, further comprising:

an electromagnetic wave receiver operatively positioned on a ski operatively connected to the frame for determining the depth; and
an actuator operatively connected to the ski to adjust the position of the ski based upon the measurements of the depth control measurement system.

\* \* \* \* \*